United States Patent Office 3,353,973
Patented Nov. 21, 1967

3,353,973
METHOD AND COMPOSITION FOR TINTING OIL AND WATER BASE PAINTS
Otto Jensen, Viby Jylland, Denmark, assignor to Conchemco Inc., Kansas City, Mo., a corporation of Missouri
No Drawing. Filed Oct. 14, 1965, Ser. No. 496,137
11 Claims. (Cl. 106—308)

This invention relates to surface coatings. More particularly, this invention relates to a method and composition for tinting both organic solvent thinned and water thinned paints.

Basically, the production of paint is the careful integration of pigments with certain liquids known as paint oils, vehicles, binders or varnishes. The resulting paint, which is usually of fluid consistency, is applied by brush, spray, roller or other convenient method and is used to protect as well as to decorate the surface to which it is applied. The properties of paints are varied depending upon the use to which they are put and the type of finish that is desired.

Paints manufactured for use on both interior and exterior surfaces are planned for the dual purpose of forming both a decorative and a protective coating. With interior paints particularly, tints in recent years have accentuated the decorative function of these products with a kaleidoscope array of colors.

One of the most important factors in the formulation of paints is the concentration by volume of the pigment with respect to the total nonvolatile volume of the paint, i.e., the sum of the volumes of pigment and nonvolatile vehicle (binder). In general, as the volume of pigments increases relative to the nonvolatile vehicle, the gloss becomes lower until the finish falls within the flat range.

The vehicle portion of paints also contributes to the appearance of the coating produced, but not to the same extent as the factors of pigmentation. Vehicles do, however, contribute to an important degree to the flexibility, desirability, washability and application properties of the coatings. They are usually made up of two main components, the volatile and nonvolatile portions. The volatile vehicle consists of solvents and diluents which reduce the viscosity of the nonvolatile vehicle to a more easily handled consistency, ease the brushability, and give paints the fluidity and stability that is required for ease of mixing. The volatile portions evaporate after application leaving behind the nonvolatile vehicle to bind the pigment particles to each other and fix the entire film in a continuous coating. The nonvolatile vehicle can be one or a blend of a number of oils and resins from chemically treated natural oils, combinations of oils and hard resins, and alkyd resins to synthetic rubber solutions and synthetic latexes.

For many years, a great percentage of paints have utilized an organic solvent or a mixture of solvents as the volatile vehicle. These paints are commonly known as oil base paints. In order to simplify the marketing of paints and to allow a wide color choice to the consumer, various tinting systems for coloring paint products have been developed. Recently, emulsion paints have been introduced and are rapidly gaining in sales. These paints consist, as their name implies, of an emulsion of two different phases, one of which is water. A considerable quantity of oleoresinous, alkyd, or other oil phase material is present in these paints, emulsified with the aqueous phase. Latex emulsion paints in which the nonaqueous phase is a synthetic rubber or rubber-like material were introduced in 1942 and their growth has been remarkable.

In emulsion paints the continuous phase is usually water. Thus the paint can be readily diluted or thinned with water. It is very easily applied with brush or roller and the applicator can be cleaned afterward with water. The paints are quick drying and free from objectionable odors and fire hazard. These advantages appeal particularly to the homeowner who does his own painting.

For most emulsion paints, water dispersible pigments are required and thus new and different problems were presented to the paint industry with the advent and success of these paints. The coloring material used for oil base paints, hereinafter designated solvent thinned paints, does not satisfactorily disperse in or color water thinned paints. It was therefore necessary to produce a separate set of tinting colors which could be used to color the water thinned paint systems. The pigments presently in use are various water dispersible pigments which are expensive and limited in selection. Even with the development of complete pigment systems, it is still necessary to provide two types of pigment for coloring paint, one for solvent thinned paints and the other for water thinned paints. An immediate problem resulting from the use of two systems is that it is difficult or impossible to match the color of a solvent thinned paint with a water thinned paint if they are to be used in conjunction with one another.

There have been proposed liquid systems of tinting materials which will color both types of paints. With the liquid or "wet" system, it is impossible to deliver a controlled or calculated amount of tinting material to the base paint because of the difficulty of transferring the coloring material. With the use of metal tubes or plastic pods, a certain percentage of the material remains in the original container. Even more important, the portion that remains will vary depending upon the technique used in dispensing the colorant.

Color dispensing machines are one of the more recent innovations in coloring paints. These employ liquid tinters that are satisfactory for use with both water thinned and solvent thinned paints. Since these materials are liquid, they are susceptible to changes in physical state, i.e., skinning, settling of pigment and even gelation. Therefore, if a color is not properly stirred before being dispensed, variations will occur.

It is therefore an object of the present invention to provide a single system of coloring material for tinting both solvent thinned and water thinned paints.

It is another object of this invention to provide a system for coloring paints wherein the tinting may be accomplished easily and quickly.

It is a further object of this invention to provide a paint coloring system wherein the addition of a given amount of tinting material to any type of paint will produce the same color characteristics.

It is a still further object of this invention to provide a tinting system wherein conventional basic pigments may be used and blended to obtain a wide variety of colors.

It is another object of this invention to provide a paint tinting system wherein it is possible to produce perfect color matches in separate portions or batches of paint.

Still another object of the present invention is to provide paint coloring materials which are stable to heat and cold, resistant to chemical and physical changes and are highly dispersible in all types of paints.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has been found that the above objects may be attained by providing a paint coloring or tinting material in the form of a free flowing powder that is dispersible in both solvent thinned and water thinned paints. The tinting material comprises color pigments, with or without added extenders, together with surface active agents. The use of certain combinations and proportions of surfactants with the pigments and extenders results in creating a dry, free flowing powder which will disperse readily and produce good color development in commercially available types of paints, e.g., oleoresinous or oil base paints, alkyd paints, emulsion paints and latex paints.

The pigments, with or without extenders, are mixed with the surface active agents or surfactants and preferably with a suitable solvent or vehicle such as water or alcohol. The mixture is then ground or dispersed in a suitable machine such as a high speed rotor mill, attrition mill, impeller mill, pebble mill, ball mill or roller mill, to a fineness of grind of no more than about 15 microns. Finally the mixture is dried, for example at 120° to 150° F., pulverized and sifted to produce a free flowing powder that will pass an 80 mesh screen and preferably a 120 mesh screen. The resulting powders may be used singly or in mixtures to achieve the desired colors and are mixed with conventional base paints. The prime pigments may be processed singly and subsequently mixed to get the desired shade or two or more pigments may be blended initially and processed together.

The selection of surface active agents (surfactants) is important and must include an oil soluble, water soluble agent together with an oil soluble, water dispersible agent or a water soluble, oil dispersible agent. In some instances, a mixture of all three types is desirable. The surfactants are plastic or solid, i.e., non-liquid, at room temperature and thus form a coating on the pigment particles and are of the anionic type.

Among the surface active agents which have been found to be particularly suitable are modified high molecular weight carboxylic acids represented by the formula

$$CH_3(CH_2)_n CON(CH_3)CH_2COOH$$

and certain salts thereof with the preferred surfactant being an alkaline earth or alkali metal salt of N-acyl-sarcosine. Many of this group are available from Geigy Industrial Chemicals as the Sarkosyls. Representative compounds include cocoyl sarcosine (oil soluble, water dispersible), sodium lauroyl sarcosinate (water soluble, oil dispersible) and magnesium cocoyl sarcosinate (oil dispersible, water dispersible). Another group of effective surfactants is available as the Nekals from Antara Chemicals, a division of General Aniline and Film Corporation. These include sulfonated aliphatic polyesters (oil soluble, water soluble) and the sodium form of the polyesters (water soluble, oil soluble) e.g., sodium bis(2,6-dimethyl-heptyl-4)sulfosuccinate. Also suitable is dioctyl sodium sulfosuccinate (oil soluble, water soluble) available as Aerosol OT from American Cyanamid Co. A 10% by weight concentration of each of the surfactants in water and an aliphatic hydrocarbon respectively was used in determining the classifications above with respect to solubility or dispersibility of the corresponding surfactants in water and hydrocarbon.

Substantially all of the commercially available paint pigments may be employed. These include both organic and inorganic materials and cover a complete color range. The pigments may be used alone for primary or deep colors, or mixed with other pigments or extenders to arrive at a particular shade. The distinction between pigments and extenders is not a fine one. However, there are important differences which are generally recognized by the paint industry. The extenders are white or near-white, or colorless and have an index of refraction substantially below 1.75 (usually 1.45–1.70). The white pigments, on the other hand, are opaque and contribute definite chemical and physical properties to surface coatings and the color pigments, of course, contribute their color characteristics.

Extenders have become increasingly important since the beginning of the 20th century and include a variety of compounds obtained from natural sources or as by-products, or manufactured directly. Calcium carbonate, natural silicates of magnesium such as talc, soapstone and steatite, and aluminum silicates including China clay, pyrophillite, bentonite, mica and pumice, are used in large amounts. Other common extenders are calcium sulfate, barium sulfate, magnesium carbonate, crystalline silica and diatomite.

A preferred method of preparing the tinting compositions of the present invention is to first form a coating vehicle which is thereafter mixed with a pigment or blend of pigment and extender. These vehicles comprise generally a mixture of surfactants and solvents therefor. Additionally, one of the preferred carboxylic acid type of surfactants is magnesium cocoyl sarcosinate since this agent, as noted above, is oil dispersible and water dispersible, has a high softening point and is a solid at room temperature. It has been found that when it is desired to include the magnesium sarcosinate in the tinting compositions, it may be formed in situ while preparing the coating vehicle. Cocoyl sarcosine is dissolved in a solvent and the magnesium carbonate added under agitation. Upon the addition of water, the reaction takes place with evolution of carbon dioxide, causing foaming. After the reaction is complete, other desired surfactants may be added. It is oftentimes desirable to vary the composition of the coating vehicle for use with the various pigments. The following are representative of vehicles which may be effectively used.

COATING VEHICLE I

| | Parts |
|---|---|
| Cocoyl sarcosine | 120 |
| Denatured alcohol | 120 |
| Basic magnesium carbonate | 40 |
| Water | 400 |
| Dioctyl sodium sulfosuccinate (75% aqueous solution) | 320 |
| Sulfonated aliphatic polyester (50% aqueous solution) | 240 |
| Sodium lauroyl sarcosinate (30% aqueous solution) | 400 |

The cocoyl sarcosine at 80° F. was placed in an agitator and dissolved in alcohol. The basic magnesium carbonate was added under agitation and when dispersed, the water was added. The reaction took place with considerable evolution of $CO_2$, causing some foaming. Agitation was maintained until the reaction was complete (about 45 minutes). The batch was then allowed to stand for an additional 75 minutes, after which the balance of ingredients was added under agitation.

The vehicle had a 40% nonvolatile component consisting of:

| | Percent |
|---|---|
| Magnesium cocoyl sarcosinate and excess magnesium carbonate | 25 |
| Dioctyl sodium sulfosuccinate | 37.5 |
| Sulfonated aliphatic polyester | 18.75 |
| Sodium lauroyl sarcosinate | 18.75 |

COATING VEHICLE II

| | Parts |
|---|---|
| Cocoyl sarcosine | 144 |
| Denatured alcohol | 144 |
| Basic magnesium carbonate | 48 |
| Water | 264 |
| Dioctyl sodium sulfosuccinate (75% aqueous solution) | 192 |
| Sulfonated aliphatic polyester (50% aqueous solution) | 288 |
| Sodium lauroyl sarcosinate (30% aqueous solution) | 480 |

The procedure followed was the same as with Coating Vehicle I.

The vehicle had a 40% nonvolatile component consisting of:

| | Percent |
|---|---|
| Magnesium cocoyl sarcosinate and excess magnesium carbonate | 30.76 |
| Dioctyl sodium sulfosuccinate | 23.08 |
| Sulfonated aliphatic polyester | 23.08 |
| Sodium lauroyl sarcosinate | 23.08 |

COATING VEHICLE III

| | Parts |
|---|---|
| Cocoyl sarcosine | 120 |
| Denatured alcohol | 120 |
| Basic magnesium carbonate | 40 |
| Sodium lauroyl sarcosinate (30% aqueous solution) | 600 |
| Dioctyl sodium sulfosuccinate (75% aqueous solution) | 320 |
| Sodium lauroyl sarcosinate (30% aqueous solution) | 1000 |

The cocoyl sarcosine at 80° F. was placed in an agitator and dissolved in alcohol. The basic magnesium carbonate was added under agitation. When dispersed the first part of the sodium lauroyl sarcosinate was added. The subsequent procedure was the same as with Coating Vehicle I.

The vehicle had a 40% nonvolatile component consisting of:

| | Percent |
|---|---|
| Magnesium cocoyl sarcosinate and excess magnesium carbonate | 18.18 |
| Dioctyl sodium sulfosuccinate | 27.27 |
| Sodium lauroyl sarcosinate | 54.55 |

COATING VEHICLE IV

| | Parts |
|---|---|
| Cocoyl sarcosine | 120 |
| Denatured alcohol | 120 |
| Basic magnesium carbonate | 40 |
| Water | 220 |
| Dioctyl sodium sulfosuccinate (75% aqueous solution) | 320 |
| Sodium lauroyl sarcosinate (30% aqueous solution) | 1200 |

The procedure followed was the same as with Coating Vehicle I.

The vehicle contains a 37.62% nonvolatile component consisting of:

| | Percent |
|---|---|
| Magnesium cocoyl sarcosinate and excess magnesium carbonate | 21.05 |
| Dioctyl sodium sulfosuccinate | 31.58 |
| Sodium lauroyl sarcosinate | 47.37 |

COATING VEHICLE V

| | Parts |
|---|---|
| Cocoyl sarcosine | 108 |
| Denatured alcohol | 108 |
| Basic magnesium carbonate | 36 |
| Water | 132 |
| Sodium lauroyl sarcosinate (30% aqueous solution) | 300 |
| Dioctyl sodium sulfosuccinate (75% aqueous solution) | 256 |
| Sodium lauroyl sarcosinate (30% aqueous solution) | 500 |

The procedure followed was the same as with Coating Vehicle III.

The vehicle had a 40% nonvolatile component consisting of:

| | Percent |
|---|---|
| Magnesium cocoyl sarcosinate and excess magnesium carbonate | 25 |
| Dioctyl sodium sulfosuccinate | 33.33 |
| Sodium lauroyl sarcosinate | 41.67 |

COATING VEHICLE VI

| | Parts |
|---|---|
| Cocoyl sarcosine | 225 |
| Denatured alcohol | 225 |
| Basic magnesium carbonate | 75 |
| Water | 275 |
| Sodium lauroyl sarcosinate (30% aqueous solution) | 160 |
| Dioctyl sodium sulfosuccinate (75% aqueous solution) | 200 |
| Sodium lauroyl sarcosinate (30% aqueous solution) | 340 |

The procedure followed was the same as with Coating Vehicle III.

The vehicle had a 40% nonvolatile component consisting of:

| | Percent |
|---|---|
| Magnesium cocoyl sarcosinate and excess magnesium carbonate | 50 |
| Dioctyl sodium sulfosuccinate | 25 |
| Sodium lauroyl sarcosinate | 25 |

COATING VEHICLE VII

| | Parts |
|---|---|
| Sulfonated aliphatic polyester (60% aqueous solution) | 200 |
| Sodium lauroyl sarcosinate (30% aqueous solution) | 400 |
| Water | 40 |

The vehicle had a 37.5% nonvolatile component consisting of:

| | Percent |
|---|---|
| Sulfonated aliphatic polyester | 50 |
| Sodium lauroyl sarcosinate | 50 |

In the following examples and throughout the specification and claims, the parts are parts by weight unless otherwise specified.

*Example 1*

| | Parts |
|---|---|
| Phthalocyanine green | 213.33 |
| Basic magnesium carbonate | 853.33 |
| Coating Vehicle I | 1600.00 |
| Water | 450.00 |

The above ingredients were mixed in a Cowles mixer and given two passes over a roller mill to a fineness of grind of 7+ on the Hegman fineness gauge. The mixture was then placed in drying pans and dried for 8 days at 120° F. Finally, the mixture was pulverized and sifted to a particle size to pass 120 mesh.

Powder contains:

| | Percent |
|---|---|
| Phthalocyanine green | 12.5 |
| Surface active ingredients | 37.5 |
| Inert | 50 |

*Example 2*

| | Parts |
|---|---|
| Copper phthalocyanine blue | 213.33 |
| Basic magnesium carbonate | 853.33 |
| Coating Vehicle I | 1600.00 |
| Water | 500.00 |

Procedure as with Example 1.

Powder contains:

| | Percent |
|---|---|
| Phthalocyanine blue | 12.5 |
| Surface active ingredients | 37.5 |
| Inert | 50 |

*Example 3*

| | Parts |
|---|---|
| Medium chrome yellow | 1440 |
| Basic magnesium carbonate | 586.67 |
| Coating Vehicle I | 1600.00 |
| Water | 250.00 |

Procedure as with Example 1.

Powder contains:

| | Percent |
|---|---|
| Medium chrome yellow | 54 |
| Surface active ingredients | 24 |
| Inert | 22 |

Example 4

| | Parts |
|---|---|
| Synthetic red iron oxide | 1440 |
| Basic magnesium carbonate | 586.67 |
| Coating Vehicle I | 1600.00 |
| Water | 225.00 |

Procedure as with Example 1.

Powder contains:

| | Percent |
|---|---|
| Red iron oxide | 54 |
| Surface active ingredients | 24 |
| Inert | 22 |

Example 5

| | Parts |
|---|---|
| Molybdate orange | 1440 |
| Basic magnesium carbonate | 586.67 |
| Coating Vehicle I | 1600.00 |
| Water | 225.00 |

Procedure as with Example 1.

Powder contains:

| | Percent |
|---|---|
| Molybdate orange | 54 |
| Surface active ingredients | 24 |
| Inert | 22 |

Example 6

| | Parts |
|---|---|
| Light chrome yellow | 1400 |
| Basic magnesium carbonate | 586.67 |
| Coating Vehicle I | 1600.00 |
| Water | 250.00 |

Procedure as with Example 1.

Powder contains:

| | Percent |
|---|---|
| Light chrome yellow | 54 |
| Surface active ingredients | 24 |
| Inert | 22 |

Example 7

| | Parts |
|---|---|
| Synthetic yellow iron oxide | 1440 |
| Basic magnesium carbonate | 586.67 |
| Coating Vehicle I | 1600.00 |
| Water | 700.00 |

Procedure as with Example 1.

Powder contains:

| | Percent |
|---|---|
| Yellow iron oxide | 54 |
| Surface active ingredients | 24 |
| Inert | 22 |

Example 8

| | Parts |
|---|---|
| Lamp black | 213.33 |
| Basic magnesium carbonate | 853.33 |
| Coating Vehicle I | 1600.00 |
| Water | 750.00 |

Procedure as with Example 1.

Powder contains:

| | Percent |
|---|---|
| Lamp black | 12.5 |
| Surface active ingredients | 37.5 |
| Inert | 50 |

Example 9

| | Parts |
|---|---|
| Thioindigo red | 213.33 |
| Basic magnesium carbonate | 853.33 |
| Coating Vehicle I | 1600.00 |
| Water | 500.00 |

Procedure as with Example 1.

Powder contains:

| | Percent |
|---|---|
| Thioindigo red | 12.5 |
| Surface active ingredients | 37.5 |
| Inert | 50 |

Example 10

| | Parts |
|---|---|
| Chrome oxide green | 1440 |
| Basic magnesium carbonate | 586.67 |
| Coating Vehicle I | 1600.00 |
| Water | 200.00 |

Procedure as with Example 1.

Powder contains:

| | Percent |
|---|---|
| Chrome oxide green | 54 |
| Surface active ingredients | 24 |
| Inert | 22 |

Example 11

| | Parts |
|---|---|
| Hansa yellow | 213.33 |
| Basic magnesium carbonate | 853.33 |
| Coating Vehicle I | 1600.00 |
| Water | 550.00 |

Procedure as with Example 1.

Powder contains:

| | Percent |
|---|---|
| Hansa yellow | 12.5 |
| Surface active ingredients | 37.5 |
| Inert | 50 |

Example 12

| | Parts |
|---|---|
| Copper phthalocyanine blue | 125 |
| Basic magnesium carbonate | 515 |
| Coating Vehicle II | 900 |
| Water | 880 |

Procedure as with Example 1.

Powder contains:

| | Percent |
|---|---|
| Phthalocyanine blue | 12.5 |
| Surface active ingredients | 36 |
| Inert | 51.5 |

Example 13

| | Parts |
|---|---|
| Copper phthalocyanine blue | 105 |
| Calcined china clay | 915 |
| Coating Vehicle II | 1200 |
| Water | 150 |

Procedure as with Example 1.

Powder contains:

| | Percent |
|---|---|
| Phthalocyanine blue | 7 |
| Surface active ingredients | 32 |
| Inert | 61 |

Example 14

| | Parts |
|---|---|
| Hansa yellow | 100 |
| Basic magnesium carbonate | 412 |
| Coating Vehicle II | 720 |
| Water | 750 |

Procedure as with Example 1.

Powder contains:

| | Percent |
|---|---|
| Hansa yellow | 12.5 |
| Surface active ingredients | 36 |
| Inert | 51.5 |

*Example 15*

| | Parts |
|---|---|
| Copper phthalocyanine blue | 225 |
| Basic magnesium carbonate | 525 |
| Coating Vehicle III | 1875 |

Procedure as with Example 1.

Powder contains:

| | Percent |
|---|---|
| Phthalocyanine blue | 15 |
| Surface active ingredients | 50 |
| Inert | 35 |

*Example 16*

| | Parts |
|---|---|
| Copper phthalocyanine blue | 225 |
| Basic magnesium carbonate | 675 |
| Coating Vehicle III | 1500 |
| Water | 350 |

Procedure as with Example 1.

Powder contains:

| | Percent |
|---|---|
| Phthalocyanine blue | 15 |
| Surface active ingredients | 40 |
| Inert | 45 |

*Example 17*

| | Parts |
|---|---|
| Medium chrome yellow | 1250 |
| Basic magnesium carbonate | 250 |
| Coating Vehicle III | 2500 |

Procedure as with Example 1.

Powder contains:

| | Percent |
|---|---|
| Medium chrome yellow | 50 |
| Surface active ingredients | 40 |
| Inert | 10 |

*Example 18*

| | Parts |
|---|---|
| Medium chrome yellow | 1250 |
| Basic magnesium carbonate | 375 |
| Coating Vehicle III | 2187.50 |

Procedure as with Example 1.

Powder contains:

| | Percent |
|---|---|
| Medium chrome yellow | 50 |
| Surface active ingredients | 35 |
| Inert | 15 |

*Example 19*

| | Parts |
|---|---|
| Light chrome yellow | 1250 |
| Basic magnesium carbonate | 375 |
| Coating Vehicle III | 2187.50 |

Procedure as with Example 1.

Powder contains:

| | Percent |
|---|---|
| Light chrome yellow | 50 |
| Surface active ingredients | 35 |
| Inert | 15 |

*Example 20*

| | Parts |
|---|---|
| Lamp black | 225 |
| Basic magnesium carbonate | 525 |
| Coating Vehicle III | 1875 |

Procedure as with Example 1.

Powder contains:

| | Percent |
|---|---|
| Lamp black | 15 |
| Surface active ingredients | 50 |
| Inert | 35 |

*Example 21*

| | Parts |
|---|---|
| Synthetic red iron oxide | 1250 |
| Basic magnesium carbonate | 375 |
| Coating Vehicle III | 2187.50 |

Procedure as with Example 1.

Powder contains:

| | Percent |
|---|---|
| Red iron oxide | 50 |
| Surface active ingredients | 35 |
| Inert | 15 |

*Example 22*

| | Parts |
|---|---|
| Molybdate orange | 1250 |
| Basic magnesium carbonate | 375 |
| Coating Vehicle III | 2187.50 |

Procedure as with Example 1.

Powder contains:

| | Percent |
|---|---|
| Molybdate orange | 50 |
| Surface active ingredients | 35 |
| Inert | 15 |

*Example 23*

| | Parts |
|---|---|
| Medium chrome yellow | 135 |
| Basic magnesium carbonate | 55 |
| Dioctyl sodium sulfosuccinate (75% aqueous solution) | 40 |
| Denatured alcohol | 10 |
| Sodium lauroyl sarcosinate (30% aqueous solution) | 100 |
| Water | 20 |

Procedure as with Example 1.

Powder contains:

| | Percent |
|---|---|
| Medium chrome yellow | 54 |
| Dioctyl sodium sulfosuccinate | 12 |
| Sodium lauroyl sarcosinate | 12 |
| Inert | 22 |

*Example 24*

| | Parts |
|---|---|
| Medium chrome yellow | 135 |
| Basic magnesium carbonate | 55 |
| Dioctyl sodium sulfosuccinate (75% aqueous solution) | 40 |
| Denatured alcohol | 10 |
| Sulfonated aliphatic polyester (50% aqueous solution) | 60 |
| Water | 60 |

Procedure as with Example 1.

Powder contains:

| | Percent |
|---|---|
| Medium chrome yellow | 54 |
| Dioctyl sodium sulfosuccinate | 12 |
| Sulfonated aliphatic polyester | 12 |
| Inert | 22 |

In Examples 23 and 24 above, no coating vehicle as such was used. The ingredients were mixed, ground, dried, pulverized and sifted.

While the magnesium cocoyl sarcosinate, when used, may be formed in situ as in Examples 1–22, a dispersion of the magnesium sarcosinate may be separately prepared and then added to other ingredients when forming the treated pigments of this invention. The dispersion may contain any suitable amount of the sarcosinate together with excess magnesium carbonate, e.g., 20%, 25%, etc. A dispersion containing 20% solids may be prepared as follows:

MAGNESIUM SARCOSINATE DISPERSION

| | Parts |
|---|---|
| Cocoyl sarcosine | 450 |
| Denatured alcohol | 450 |
| Basic magnesium carbonate | 150 |
| Water | 1950 |

The cocoyl sarcosine at 80° F. was placed in an agitator and dissolved in the alcohol. The basic magnesium carbonate was added under agitation and when dispersed, the water was added. The reaction takes place with considerable evolution of $CO_2$ causing some foaming. Agitation was continued until reaction was completed (about 45 minutes).

Dispersion contains: Magnesium cocoyl sarcosinate and excess magnesium carbonate, 20%.

Dispersions containing other amounts of the sarcosinate may be prepared by varying the amounts of ingredients.

Examples 26–28 illustrate the use of the magnesium sarcosinate dispersions. While the magnesium salt is preferred, the alkali metal salts may also be prepared in a similar manner.

*Example 25*

| | Parts |
|---|---|
| Medium chrome yellow | 135 |
| Basic magnesium carbonate | 55 |
| Sodium lauroyl sarcosinate (30% aqueous solution) | 100 |
| Sulfonated aliphatic polyester (50% aqueous solution) | 60 |
| Water | 40 |

Procedure as with Example 1.

Powder contains:

| | Percent |
|---|---|
| Medium chrome yellow | 54 |
| Sodium lauroyl sarcosinate | 12 |
| Sulfonated aliphatic polyester | 12 |
| Inert | 22 |

*Example 26*

| | Parts |
|---|---|
| Medium chrome yellow | 135 |
| Basic magnesium carbonate | 55 |
| 20% magnesium sarcosinate dispersion | 75 |
| Dioctyl sodium sulfosuccinate (75% aqueous solution) | 30 |
| Sulfonated aliphatic polyester (50% aqueous solution) | 45 |
| Water | 75 |

Procedure as with Example 1.

Powder contains:

| | Percent |
|---|---|
| Medium chrome yellow | 54 |
| Magnesium sarcosinate and excess magnesium carbonate | 6 |
| Dioctyl sodium sulfosuccinate | 9 |
| Sulfonated aliphatic polyester | 9 |
| Inert | 22 |

*Example 27*

| | Parts |
|---|---|
| Medium chrome yellow | 135 |
| Basic magnesium carbonate | 55 |
| 33% magnesium sarcosinate dispersion | 45 |
| Dioctyl sodium sulfosuccinate (75% aqueous solution) | 30 |
| Sodium lauryl sarcosinate (30% aqueous solution) | 75 |
| Water | 35 |

Procedure as with Example 1.

Powder contains:

| | Percent |
|---|---|
| Medium chrome yellow | 54 |
| Magnesium sarcosinate and excess magnesium carbonate | 6 |
| Dioctyl sodium sulfosuccinate | 9 |
| Sodium lauroyl sarcosinate | 9 |
| Inert | 22 |

*Example 28*

| | Parts |
|---|---|
| Medium chrome yellow | 135 |
| Basic magnesium carbonate | 55 |
| 50% magnesium sarcosinate dispersion | 30 |
| Sulfonated aliphatic polyester (50% aqueous solution) | 45 |
| Sodium lauroyl sarcosinate (30% aqueous solution) | 75 |
| Water | 40 |

Procedure as with Example 1.

Powder contains:

| | Percent |
|---|---|
| Medium chrome yellow | 54 |
| Magnesium sarcosinate and excess magnesium carbonate | 6 |
| Sulfonated aliphatic polyester | 9 |
| Sodium lauroyl sarcosinate | 9 |
| Inert | 22 |

*Example 29*

| | Parts |
|---|---|
| Medium chrome yellow | 1800 |
| Basic magnesium carbonate | 390 |
| Coating Vehicle V | 2025 |

Procedure as with Example 1.

Powder contains:

| | Percent |
|---|---|
| Medium chrome yellow | 60 |
| Surface active ingredients | 27 |
| Inert | 13 |

*Example 30*

| | Parts |
|---|---|
| Light chrome yellow | 1800 |
| Basic magnesium carbonate | 390 |
| Coating Vehicle V | 2025 |
| Water | 100 |

Procedure as with Example 1.

Powder contains:

| | Percent |
|---|---|
| Light chrome yellow | 60 |
| Surface active ingredients | 27 |
| Inert | 13 |

*Example 31*

| | Parts |
|---|---|
| Lamp black | 300 |
| Basic magnesium carbonate | 525 |
| Coating Vehicle V | 1687.5 |
| Water | 400 |

Procedure as with Example 1.

Powder contains:

| | Percent |
|---|---|
| Lamp black | 20 |
| Surface active ingredients | 45 |
| Inert | 35 |

*Example 32*

| | Parts |
|---|---|
| Phthalocyanine green | 300 |
| Basic magnesium carbonate | 525 |
| Coating Vehicle V | 1687.5 |
| Water | 100 |

Procedure as with Example 1.

Powder contains:

| | Percent |
|---|---|
| Phthalocyanine green | 20 |
| Surface active ingredients | 45 |
| Inert | 35 |

*Example 33*

| | Parts |
|---|---|
| Thioindigo red | 300 |
| Basic magnesium carbonate | 525 |
| Coating Vehicle V | 1687.5 |
| Water | 200 |

Procedure as with Example 1.

Powder contains:

| | Percent |
|---|---|
| Thioindigo red | 20 |
| Surface active ingredients | 45 |
| Inert | 35 |

*Example 34*

| | Parts |
|---|---|
| Copper phthalocyanine blue | 300 |
| Basic magnesium carbonate | 525 |
| Coating Vehicle V | 1687.5 |
| Water | 200 |

Procedure as with Example 1.

Powder contains:

| | Percent |
|---|---|
| Phthalocyanine blue | 20 |
| Surface active ingredients | 45 |
| Inert | 35 |

*Example 35*

| | Parts |
|---|---|
| Molybdate orange | 1800 |
| Basic magnesium carbonate | 390 |
| Coating Vehicle V | 2025 |

Procedure as with Example 1.

Powder contains:

| | Percent |
|---|---|
| Molybdate orange | 60 |
| Surface active ingredients | 27 |
| Inert | 13 |

*Example 36*

| | Parts |
|---|---|
| Synthetic red iron oxide | 1800 |
| Basic magnesium carbonate | 390 |
| Coating Vehicle V | 2025 |
| Water | 100 |

Procedure as with Example 1.

Powder contains:

| | Percent |
|---|---|
| Synthetic red iron oxide | 60 |
| Surface active ingredients | 27 |
| Inert | 13 |

*Example 37*

| | Parts |
|---|---|
| Rutile titanium dioxide | 1800 |
| Basic magnesium carbonate | 390 |
| Coating Vehicle V | 2025 |
| Water | 100 |

Procedure as with Example 1.

Powder contains:

| | Percent |
|---|---|
| Titanium dioxide | 60 |
| Surface active ingredients | 27 |
| Inert | 13 |

*Example 38*

| | Parts |
|---|---|
| Synthetic yellow iron oxide | 1200 |
| Basic magnesium carbonate | 260 |

*Example 38—Continued*

| | Parts |
|---|---|
| Coating Vehicle V | 1350 |
| Water | 600 |

Procedure as with Example 1.

Powder contains:

| | Percent |
|---|---|
| Yellow iron oxide | 60 |
| Surface active ingredients | 27 |
| Inert | 13 |

*Example 39*

| | Parts |
|---|---|
| Primrose chrome yellow | 1800 |
| Basic magnesium carbonate | 390 |
| Coating Vehicle V | 2025 |
| Water | 100 |

Procedure as with Example 1.

Powder contains:

| | Percent |
|---|---|
| Primrose chrome yellow | 60 |
| Surface active ingredients | 27 |
| Inert | 13 |

*Example 40*

| | Parts |
|---|---|
| Light chrome yellow | 1800 |
| Basic magnesium carbonate | 390 |
| Coating Vehicle VII | 2025 |
| Water | 300 |

Procedure as with Example 1.

Powder contains:

| | Percent |
|---|---|
| Light chrome yellow | 60 |
| Surface active ingredients | 27 |
| Inert | 13 |

*Example 41*

| | Parts |
|---|---|
| Copper phthalocyanine blue | 300 |
| Basic magnesium carbonate | 525 |
| Coating Vehicle VI | 1687.5 |
| Water | 200 |

Procedure as with Example 1.

Powder contains:

| | Percent |
|---|---|
| Phthalocyanine blue | 20 |
| Surface active ingredients | 45 |
| Inert | 35 |

*Example 42*

| | Parts |
|---|---|
| Phthalocyanine green | 300 |
| Basic magnesium carbonate | 525 |
| Coating Vehicle VI | 1687.5 |
| Water | 100 |

Procedure as with Example 1.

Powder contains:

| | Percent |
|---|---|
| Phthalocyanine green | 20 |
| Surface active ingredients | 45 |
| Inert | 35 |

*Example 43*

| | Parts |
|---|---|
| Medium chrome yellow | 1800 |
| Basic magnesium carbonate | 390 |
| Coating Vehicle VII | 2160 |

Procedure as with Example 1.

Powder contains:

| | Percent |
|---|---|
| Medium chrome yellow | 60 |
| Surface active ingredients | 27 |
| Inert | 13 |

Example 44

| | Parts |
|---|---|
| Lamp black | 300 |
| Basic magnesium carbonate | 525 |
| Coating Vehicle VII | 1800 |
| Water | 200 |

Procedure as with Example 1.

Powder contains:

| | Percent |
|---|---|
| Lamp black | 20 |
| Surface active ingredients | 45 |
| Inert | 35 |

Example 45

| | Parts |
|---|---|
| Synthetic red iron oxide | 1800 |
| Basic magnesium carbonate | 390 |
| Coating Vehicle VII | 2160 |
| Water | 200 |

Procedure as with Example 1.

Powder contains:

| | Percent |
|---|---|
| Red iron oxide | 60 |
| Surface active ingredients | 27 |
| Inert | 13 |

Example 46

| | Parts |
|---|---|
| Molybdate orange | 1800 |
| Basic magnesium carbonate | 390 |
| Coating Vehicle VII | 2160 |
| Water | 200 |

Procedure as with Example 1.

Powder contains:

| | Percent |
|---|---|
| Molybdate orange | 60 |
| Surface active ingredients | 27 |
| Inert | 13 |

The proportions of specific components set forth in the examples above are the preferred amounts to give the best products. However, it is to be understood that variations in such proportions may be made without departing from the scope of this invention, so long as acceptable dispersion of the pigments in the liquid carrier therefor is maintained.

The treated pigments produced according to the foregoing examples may be dispersed readily in both solvent thinned and water thinned paints. The various types of paints may be adjusted so that the addition of the same amount of tinting material will produce the same paint color. The characteristics of the various paints may be controlled for tinting strength by one or more of the following expedients. The hiding properties may be varied by the addition of white opaque pigments or extenders. Additionally, to achieve complete dispersion of the tinting powders, mutual solvents for the coating on the powder and for the paint vehicle may be employed, e.g., Cellosolve or an alcohol. Use of the above expedients produces acceptable color matches between tinted paints of different batches or of different types, e.g., an alkyd paint and an oleo-resinous paint, or alkyd paint and latex paint, or oleoresinous paint and latex paint.

Since the treated pigments are in the form of free flowing powders, they may be accurately weighed into a dispensing container which in turn can be completely emptied or delivered to the paint base container. Also, since the tinting or color strength is carefully controlled, it is possible to produce perfect color matches as noted above. The tinting material is readily dispersible in the base paint by shawing for a few minutes, normally about 4 minutes, on a conventional paint shaker. Of course, the mixing may be done by hand if necessary.

The products of this invention are stable to both heat and cold and are resistant to chemical and physical changes. The treated pigments made according to the foregoing examples were tested for stability by storing for 30 days at 110° to 130° F. and for 30 days at 0° to 10° F. with no ill effects. After being subject to continuous rolling for 24 hours at the rate of 30 to 40 r.p.m., there was no agglomeration of the particles. The treated pigments are also resistant to the adsorption of moisture, and contain at most about 3% moisture by weight.

As is seen in the foregoing examples, the compositions contain from 7 to 60% by weight of the pigments, from 24 to 50% by weight of the surface active ingredients and from 13 to 51.5% by weight of the extenders.

Having thus described the invention what is claimed as new and desired to be secured by Letters Patent is:

1. A composition in free flowing powder form for use in tinting organic solvent thinned paints and water thinned paints consisting essentially of a member selected from the group consisting of a pigment and a mixture of a pigment and an extender, coated with a surface active composition which is non-liquid at room temperature and having at least one water soluble, oil soluble anionic surfactant component and a surfactant component selected from the group consisting of an alkaline earth salt of an N-acyl sarcosine, an alkali metal salt of an N-acyl sarcosine, and mixtures thereof, there being from about 7% to approximately 60% by weight of said pigment, from about 24% to approximately 50% by weight of the surface active composition, and from about 13% to approximately 52% by weight of said extender when used, said anionic surfactant component being present in a range of about 22% to approximately 74% by weight of the total surface active composition and the sarcosine salt surfactant component being present in a range of about 26% to approximately 78% by weight of the total surface active composition.

2. A composition according to claim 1 wherein the powders have a particle size to pass a least an 80 mesh screen.

3. A composition according to claim 1 wherein the powders have a particle size to pass at least a 120 mesh screen.

4. A composition according to claim 1 having a moisture content not more than about 3% by weight.

5. A composition according to claim 1 wherein the oil soluble, water soluble anionic surfactant component is selected from the group consisting of dioctyl sodium sulfosuccinate and a sulfonated aliphatic polyester, the alkaline earth salt of an N-acyl sarcosine is magnesium cocoyl sarcosinate and the alkali metal salt of an N-acyl sarcosine is sodium lauroyl sarcosinate.

6. A composition according to claim 5 wherein said extender is basic magnesium carbonate.

7. A method of preparing a composition in free flowing powder form for use in tinting paints comprising the steps of forming a solution containing at least one water soluble, oil soluble anionic surfactant component and a surfactant component selected from the group consisting of an alkaline earth salt of an N-acyl sarcosine, an alkali metal salt of an N-acyl sarcosine, and mixtures thereof, adding to the solution a member selected from the group consisting of a pigment and a mixture of a pigment and an extender, on a final dry weight basis, there being from about 7% to approximately 60% by weight of said pigment, from about 24% to approximately 50% by weight of the surface active composition, and from about 13% to approximately 52% by weight of said extender when used, said anionic surfactant component being present in a range of about 22% to approximately 74% by weight of the total surface active composition and the sarcosine salt surfactant component being present in a range of about 26% to approximately 78% by weight of the total surface active composition, drying the mixture formed thereby, and pulverizing the dried mixture to produce said free flowing powder.

8. A method according to claim 7 wherein the mixture is ground to a particle size to pass a 120 mesh screen.

9. A method according to claim 7 wherein the mixture is dried at a temperature of between about 120° and 150° F.

10. A method according to claim 7 wherein the oil soluble, water soluble anionic surfactant component is selected from the group consisting of dioctyl sodium sulfosuccinate and a sulfonated aliphatic polyester, the alkaline earth salt of an N-acyl sarcosine is magnesium cocoyl sarcosinate and the alkali metal salt of an N-acyl sarcosine is sodium lauroyl sarcosinate.

11. A method according to claim 10 wherein is included the step of adding from 13% to 51.5% of basic magnesium carbonate as an extender and a quantity of cocoyl sarcosinate whereby magnesium cocoyl sarcosinate is formed in situ.

References Cited
UNITED STATES PATENTS

| | | | |
|---|---|---|---|
| 3,067,053 | 12/1962 | Tarantino | 106—308 |
| 3,159,498 | 12/1964 | Davis et al. | 106—309 |

FOREIGN PATENTS

| | | |
|---|---|---|
| 918,516 | 2/1963 | Great Britain. |

TOBIAS E. LEVOW, *Primary Examiner.*

J. E. POER, *Assistant Examiner.*